United States Patent Office 3,544,872
Patented Dec. 1, 1970

3,544,872
ARRANGEMENT FOR MAINTAINING THE SPEED OF A D.C. MOTOR CONSTANT
Dietmar Rudolph, Heilbronn-Sontheim, and Winfried Mieslinger, Nuremberg, Germany, assignors to Gebruder Buhler Nachfolger G.m.b.H., Nuremberg, Germany
Filed Aug. 8, 1968, Ser. No. 751,167
Claims priority, application Germany, Aug. 11, 1967, 1,588,068
Int. Cl. H02p 7/36
U.S. Cl. 318—328                               9 Claims

ABSTRACT OF THE DISCLOSURE

A speed regulating arrangement for maintaining the speed of a D.C. motor constant. The D.C. motor is mechanically coupled to an electrical generator serving as a feed-back element. The output of the generator is made a function of the speed of the motor and the generator, and is applied to a controlling transistor, by way of a potentiometer. The series circuit of a Zener diode and a resistor is used to stabilize a voltage for operating the motor, and to provide the stabilized potential to the potentiometer. The superimposed signal of the generator output and the stabilized potential provided by the Zener diode, is applied to the base of the controlling transistor by means of the sliding contact of the potentiometer. A controlling transistor operates to regulate the flow of current to the motor and thus regulates the motor speed to realize constant speed operation.

BACKGROUND OF THE INVENTION

The present invention resides in an electrical arrangement for the purpose of maintaining constant the rotary speed of a D.C. motor. The latter is fed by a transistor which behaves as a variable resistor. The motor to be speed regulated operates in conjunction with an auxiliary generator and a Zener diode used for the purpose of taking into account varying motor loads.

It is well known in the art to couple an auxiliary generator to the shaft of miniature D.C. motors. In such known arrangements the output of the auxiliary generator is connected in series with a resistor and a Zener diode. A breakdown voltage of the Zener diode in such arrangements corresponds to the desired rotational speed of the D.C. motor as represented by the voltage output of the auxiliary generator. A voltage drop across the resistor is applied to a transistor amplifier for the purpose of controlling the operating current to the motor. A typical arrangement of such a known speed regulating circuit is shown in the German Pat. 1,166,904. In the arrangement such as shown in the German patent, a Zener diode is used to achieve a desired predetermined rotational speed, as reflected by a correspondingly predetermined reference voltage. This arrangement, however, has the disadvantage that a voltage fluctuation of the battery affect the operational characteristics of the arrangement. Thus, the operating power supply or power source for the D.C. motor is arranged in the system so that the voltage of the source influences directly the rotational speed of the motor.

It would be possible in such arrangements as described above, to use a second Zener diode for the purpose of stabilizing the operating battery voltage, Zener diodes, however, are relatively costly, and therefore the stabilization of the battery voltage through the use of an auxiliary or additional Zener diode is not an arrangement which is desirable from the economic point of view.

It is accordingly a principal object of the present invention to provide an arrangement for maintaining constant the rotational speed of a miniature D.C. motor, without the use of complex equipment and circuitry. It is a specific object of the present invention to achieve constant speed of a D.C. motor through the application of only a single Zener diode, and to use such a Zener diode in the control circuit so that a stabilized voltage is attained for the purpose of speed regulation. It is also an object of the present invention that the voltage variations or fluctuations of the operating D.C. power supply or source, have no effect upon the rotational speed of the motor.

The objects of the present invention are achieved through the design that the Zener diode is connected in series with a resistor, and this series circuit is, in turn, connected across the operating D.C. power supply of the motor. The output of the auxiliary generator is connected between the junction of the Zener diode and the resistor, and the base of a transistor.

For the purpose of realizing precise regulation with regard to the desired rotational speed, a potentiometer is connected into the output circuit of the auxiliary generator. One terminal of the auxiliary generator and one end or terminal of the potentiometer winding are connected to the junction of the Zener diode and the resistor in series with the diode. The sliding contact of the potentiometer is connected to the base of the transistor which controls the motor current. A sliding contact of the potentiometer can in another design, also be connected to the base of a preamplifier transistor which serves as a driving stage for a power transistor which, in turn, controls the motor current. A rectifying diode is connected in the path between the other output of the auxiliary generator and the other end or terminal of the potentiomter which is opposite to the potentiometer terminal connected to the junction between the Zener diode and the resistor. In another design or embodiment this rectifying diode can be connected in the circuit path between the sliding contact and the potentiometer and the base of a transistor for controlling the motor current.

SUMMARY OF THE INVENTION

A speed regulating arrangement for a D.C. motor in which an auxiliary generator is used as a feed-back element. The generator is mechanically coupled to the shaft of the motor and provides an output voltage signal representative of the speed of the motor. The voltage output of a generator is rectified and applied to a potentiometer to which a stabilized reference voltage is also applied. This stabilized potential is obtained through a Zener diode circuit applied across the operating voltage supply or source. A sliding contact of the potentiometer having a potential proportional to the superposition of a voltage output of the generator and the stabilized fixed potential resulting from the Zener diode, is applied to the base of a controlling transistor which controls the magnitude of the motor current. The transistor which serves as a regulator switch may be a power transistor which is, in turn, controlled by a transistor preamplifier. In such a design the sliding contact of the potentiometer is directly connected to the base of the preamplifying transistor. The rectifying diode for rectifying the voltage output of the auxiliary generator may be connected in the circuit path between one of the generator terminals and one of the potentiometer winding terminals. In another design or embodiment, the rectifying diode may be located in the circuit path between the sliding contact of the potentiometer and the base of the controlling transistor for controlling the motor current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
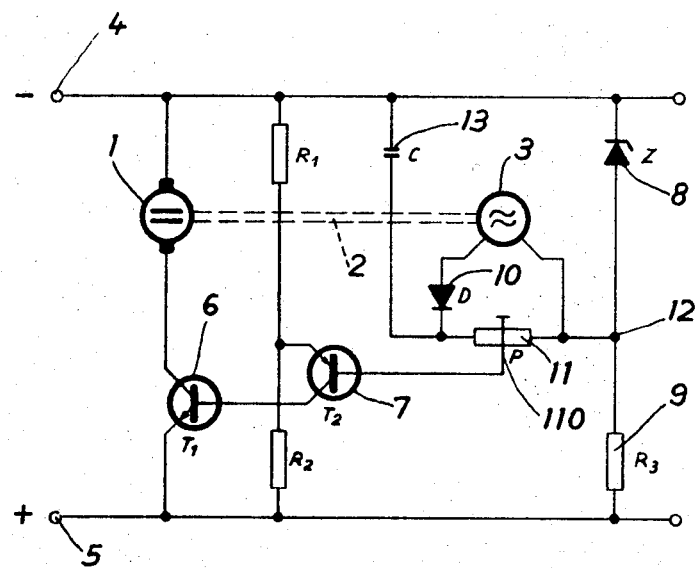
FIG. 1 is an electrical schematic diagram of the speed regulating circuit for regulating and maintaining constant the speed of a D.C. motor, through the use of auxiliary generator, in accordance with the present invention.

Referring ot the drawing, a D.C. motor 1 is mechanically coupled through its shaft to an auxiliary generator 3. The mechanical coupling between the shafts of the motor and of the generator is represented in the drawing by the dashed lines 2. This mechanical coupling will be in the form of suitable gearing, for example, which relates the mechanical shaft rotations of these two rotary components 1 and 3. The auxiliary generator 3 may, for example, be constructed in a manner in which its shaft carries a plurality of permanent magnets, and a stationary coil is provided in which an A.C. voltage is generated. A D.C. motor 1 is fed or energized from an operating D.C. power supply source, not shown. Such a D.C. source may, for example, be in the form of a battery having a negative terminal 4 and a positive terminal 5. The operating current for the motor 1 is conducted through the emitter-collector path of the transistor 6 which is a power transistor. The base of the transistor 6 is connected to the collector of a transistor 7 which serves as a driving stage and has the effect of a variable resistor. The emitter-collector path of the transistor 6 is conducted in series with the power supply line of the motor 1. Accordingly, the motor may be rotating or stationary depending upon whether the transistor 6 is in the conducting state or in the cut-off state.

A Zener diode 8 connected in series with a resistor 9 is connected across the positive and negative terminals 5 and 4 of the operating D.C. power supply. Connected across the electrical output of the auxiliary generator 3, is a potentiometer 11 in series with a rectifier or diode 10. One terminal output of the auxiliary generator 3 is connected to the junction of the Zener diode 8 and the resistor 9. This junction 12 also is electrically connected to one end of the potentiometer 11. The junction between the diode 10 and the other end of the potentiometer 11, is connected to a capacitor 13 at one electrode or plate of the capacitor. The other electrode or plate of the capacitor 13 is connected to the negative supply terminal of four of the D.C. power supply. The sliding terminal 110 of the potentiometer 11 is connected to the base of the transistor 7. The power transistor 6 and the transistor 7 are arranged in opposite polarity, so that the collector of the transistor 7 is connected, in the conventional manner, to the base of the power transistor 6.

As a result of the Zener diode 8, a stable voltage potential is maintained at the junction 12 between the resistor 9 and the Zener diode 8. This potential at the junction 12 is superimposed upon the rectified output voltage of the generator 3 which, shown in the drawing, is applied to one terminal of the potentiometer 11. The voltage output of the auxiliary generator 3 is a function of the rotational speed of the generator. The sliding terminal contact 110 of the potentiometer 11 thereby has applied to it a precisely defined and stabilized reference voltage for the purpose of controlling the base of the transistor 7. In view of the interconnections of the transistors 7 and 6, the state of the transistor 7 also controls the state of transistor 6 which, in turn, determines the current from the D.C. motor 1, since that current must necessarily flow through the emitter-collector path of the power transistor 6. The Zener diode 8, therefore, serves the purpose of stabilizing the voltage of the operating power supply or source, and furthermore provides a constant reference voltage.

Figure 2:
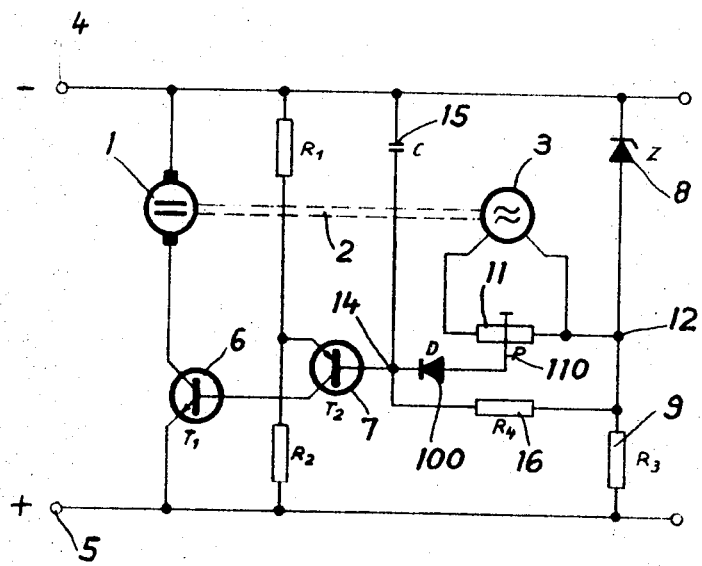
FIG. 2 is an electrical schematic diagram of another embodiment of the speed regulating arrangement of FIG. 1, and shows an alternate design for connecting the diode which rectifies the voltage output of the auxiliary generator, in accordance with the present invention.

The embodiment of FIG. 2 differs from that of FIG. 1 through the change in the interconnection or circuit arrangement of the rectifier or diode 100. This diode 100 is connected between the sliding contact 110 of the potentiometer and the base of the transistor 7 which serves as a preamplifier. The junction between the base of transistor 7 and the diode 100 leads to the negative terminal of the power supply, by way of a capacitor 15. At the same time, this junction 14 between the base of transistor 7 and diode 100 also leads to the junction 12 or one terminal of the resistor 9, by way of a resistor 16. As noted above, the junction 12 is at a stabilized potential between the Zener diode 8 and the resistor 9. Through the use of the potentiometer 11, the desired rotational speed of the motor 1 may also be maintained precisely regulated through this embodiment of FIG. 2.

In operation, a fixed reference voltage or stabilized potential at the junction 12 is superimposed upon the generator output and, depending upon the position of the sliding contact 110 of the potentiometer 11, a voltage signal is applied to the base of the preamplifier 7, depending upon the speed of the auxiliary generator 3. This signal applied to the transistorized preamplifier 7 is used to control the conducting state of the power transistor 6. The latter, in turn, establishes the magnitude of current transmitted to the motor 1, and thereby regulates the speed of the motor. Thus, the speed of the motor 1 will increase or decrease depending upon whether the current through the emitter-collector path of the transistor 6 is greater or smaller. Since the motor is mechanically coupled to the auxiliary generator 3 through the mechanical coupling 2, the speed of the auxiliary generator 3 is determined by the rotational speed of the motor 1. Accordingly, the output voltage signal applied to the potentiometer 11 by the output of the generator 3, is functionally dependent upon the speed of the generator 3 and is, therefore, representative of the speed of the motor 1. Accordingly, depending upon the position of the sliding contact 110, if the motor 1 exceeds a predetermined or desired speed, the output voltage of the generator 3 will correspondingly be above a predetermined value. Since the operating state of the preamplifier 7 is established by the voltage output of the potentiometer 11, as reflected by the potential of the sliding contact 110, the power transistor 6 is controlled by the transistor 7 so that less current is applied to the motor 1 through the emitter-collector path of the transistor 6. With less current thus being transmitted to the motor 1, the later will decrease in speed and be brought to the desired predetermined speed. Correspondingly, when any speed of the motor 1 is below a predetermined or desired value, power transistor 6 is controlled by the transistor 7 so that a larger amount of current is transmitted to the motor 1 and the speed of the latter becomes increased to the desired value. Through this type of feed-back action resulting from the provision of the auxiliary generator 3 in conjunction with the feedback circuitry of the potentiometer 11 and preamplifier 7, a speed of the motor 1 may be closely regulated.

It will be understood that each of the elements described above, or two or more together, may also find a useful application in other types of constructions differing from the types described above.

While the invention has been illustrated and described as embodied in speed regulating circuits for D.C. motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended claims:

1. An arrangement for regulating the speed of a D.C. motor under varying motor loads comprising, in combination, A.C. electrical generator means mechanically coupled to said motor so that the speed of said generator means is directly related to the speed of said motor, said generator means providing a voltage signal representative of the speed of said generator means and thereby representative of the speed of said motor; diode means connected in series with the output of said A.C. generator means; a substantially low current source of D.C. voltage for energizing and operating said motor; a transistor with emitter-collector path connected between said motor and said source of voltage for controlling the current from said source to said motor and thereby controlling the speed of said motor; a series circuit of a Zener diode and a resistor connected across said source of voltage; and connecting means for connecting said generator means between the base of said transistor and the junction of said Zener diode and said resistor whereby the base of said resistor whereby the base potential of said transistor is a function of the speed of said motor and controls the motor current to maintain the speed of said motor at a predetermined and constant value.

2. An arrangement for regulating the speed of a D.C. motor under varying motor loads as defined in claim 1 including potentiometer means with potentiometer winding connected across the voltage output of said generator means, one end of said potentiometer winding being connected to the junction between said zener diode and said resistor and the sliding contact of said potentiometer means being connected to the base of said transistor.

3. The arrangement for regulating the speed of a D.C. motor under varying motor loads as defined in claim 2 including transistor preamplifier means for driving said transistor controlling the current to said motor.

4. The arrangement for regulating the speed of a D.C. motor under varying motor loads as defined in claim 2 including diode means connected between the base of said transistor and the sliding contact of said potentiometer.

5. The arrangement for regulating the speed of a D.C. motor under varying motor loads as defined in claim 1 wherein a emitter-collector path of said transistor is connected in series with said motor.

6. The arrangement for regulating the speed of a D.C. motor under varying motor loads as defined in claim 1 including capacitor means connected between the base of said transistor and said source of voltage.

7. The arrangement for regulating the speed of a D.C. motor under varying motor loads as defined in claim 2 including capacitor means connected between said source of voltage and one end of said winding of said potentiometer.

8. The arrangement for regulating the speed of a D.C. motor under varying motor loads as defined in claim 3 including a first voltage dividing resistor and a second voltage dividing resistor connected in series, the series combination of said voltage dividing resistors being connected across said source of voltage, the junction of said first and second voltage dividing resistors being connected to the emitter of said transistor preamplifier, said transistor preamplifier being connected to said transistor for controlling the current of said motor.

9. The arrangement for regulating the speed of a D.C. motor under varying motor loads as defined in claim 3 including transistor preamplifier means connected to said potentiometer means and said transistor for driving said transistor controlling the current to said motor.

References Cited
UNITED STATES PATENTS

| | | | |
|---|---|---|---|
| 3,024,401 | 3/1962 | Dinger | 318—327 |
| 3,233,163 | 2/1966 | Mishima | 318—327 |
| 3,249,839 | 5/1966 | Fay | 318—327 |

ORIS L. RADER, Primary Examiner

T. LANGER, Assistant Examiner